UNITED STATES PATENT OFFICE.

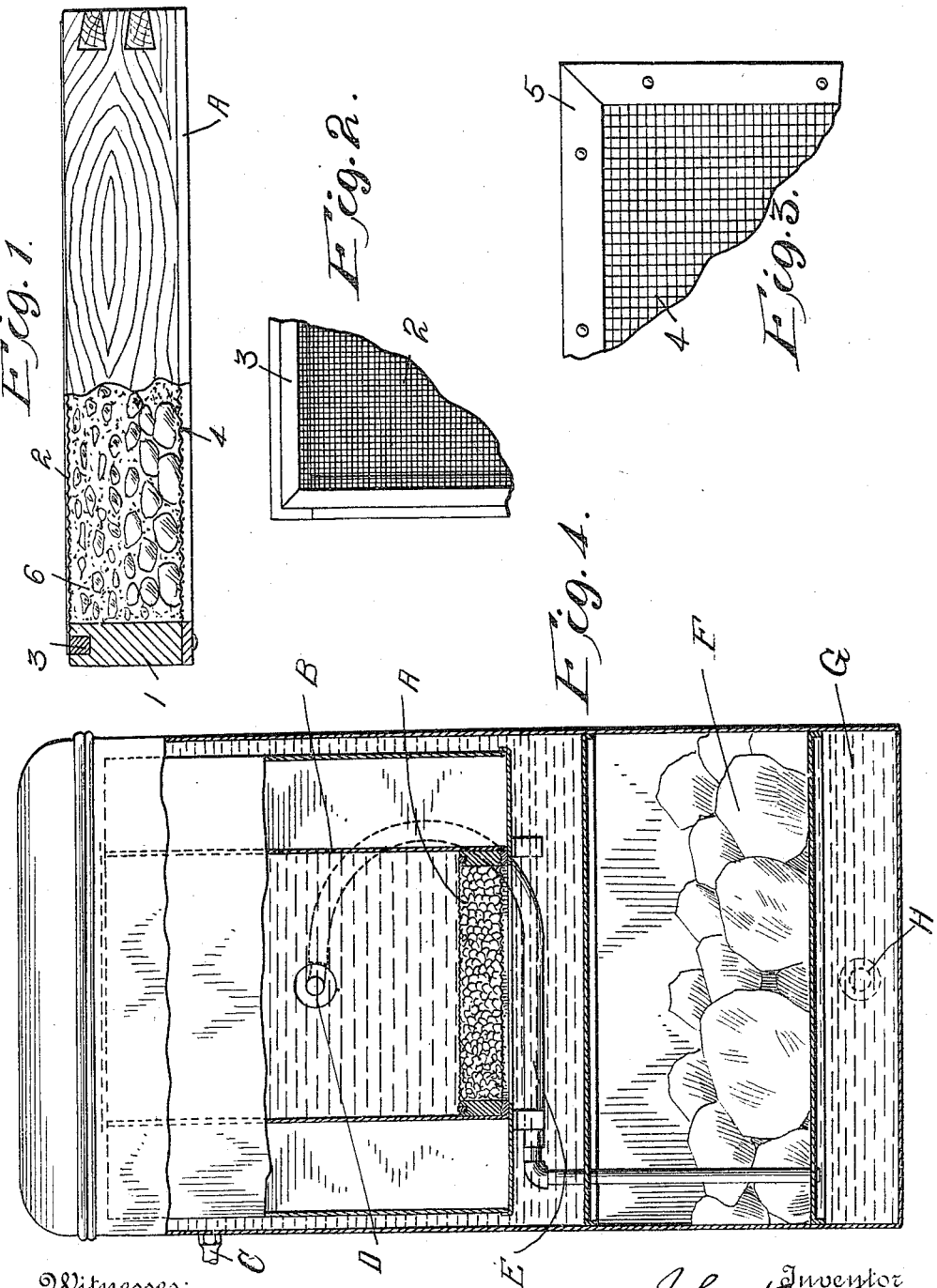

JOHN ROCHE, OF NEW YORK, N. Y., ASSIGNOR TO ALBERT OLIVER, OF BROOKLYN, NEW YORK.

FILTER.

964,696.  Specification of Letters Patent.  Patented July 19, 1910.

Application filed October 23, 1908. Serial No. 459,119.

*To all whom it may concern:*

Be it known that I, JOHN ROCHE, a citizen of the United States, and a resident of the city and county of New York, State of New York, have invented new and useful Improvements in Filters, of which the following is a specification.

This invention relates to a new and improved construction of filter.

The principal objects of the invention are to improve the construction and increase the efficiency of such device.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of the following claims without departing from the spirit of the invention.

In the accompanying drawing forming part of this specification, Figure 1 is a side elevation, partly in section, of a filter constructed in accordance with my invention. Fig. 2 is a detailed plan view of the upper side thereof. Fig. 3 a similar view of the lower side thereof. Fig. 4 a sectional elevation of an apparatus wherein a filter may be advantageously employed.

In constructing the filter, which as a whole is designated by the character A, sideframes 1 of non-conducting material, preferably wood, are suitably secured to each other, as by being dovetailed. Suitably secured to the upper side of the frame is a fine copper screen 2, which may be held in place by a rib 3, pressing the outer edge of the said screen into a slot in the side-frames 1. The lower surface of the filter is covered by a somewhat coarser screen 4, made of zinc, which is likewise suitably attached to the side-frames 1, as by strips 5, which may be of wood, and are attached to the side-frames by screws or nails, and between which and the side-frames the coarse screen 2 is passed. The space between the screens 2 and 4 is filled with pulverized carbon 6, for which purpose charcoal is admirably adapted, and this is preferably made with a layer of finely pulverized charcoal at the upper surface, and of coarser particles at the lower part, the intermediate charcoal gradually increasing in size from the lower to the upper parts.

My improved filter is admirably adapted for use as a floating filter of the character illustrated in Fig. 4, which is here shown for the purpose of illustration merely. In this device the filter A is situated at the lower part of receptacle B, which is designed to receive the filtered water. The water inlet is shown at C, whence the water passes through filter A to receptacle B, and when it has risen to a sufficient height therein, it passes out through outlet D and pipe E, through, if desired, a cooling chamber F, which may be filled with ice, to lower chamber G, from which it may be drawn as desired by outlet H. It will be perceived that the improved filter shown is admirably adapted for use in a device of the character described, which may be a portable device suitable for household use, and is of such construction that it may easily be renewed from time to time as desired. The use of the zinc and copper screens causes a certain galvanic action to take place when the water is flowing through the filter, by which a certain amount of the water is decomposed and oxygen liberated, and this nascent oxygen has a desirable purifying effect upon organic impurities which may be in the water.

What is claimed as new is:

1. A filtering apparatus comprising an outer case, an unpurified water receptacle in the upper part thereof, a purified water chamber in the bottom thereof, an intermediate cooling chamber, a filtering tank arranged to float in the water in the upper chamber having a filtration bed in its bottom and a conduit leading from its interior to the purified water chamber.

2. A filtering apparatus comprising an outer case, an unpurified water chamber in its top, a purified water chamber at its bottom, an intermediate ice chamber, filtering tank having air chambers in its walls arranged to float in the water in said upper chamber, and a conduit connecting its interior with the purified water chamber.

In testimony whereof, I have hereunto set my hand in the presence of two subscribing witnesses.

JOHN ROCHE.

Witnesses:
 JOHN H. PYPER,
 T. D. MERWIN.